(12) United States Patent
Viegas

(10) Patent No.: US 8,020,407 B2
(45) Date of Patent: Sep. 20, 2011

(54) CLOSED AND OPEN LOOP CRYOGENIC REFRIGERATION SYSTEM

(75) Inventor: Herman H. Viegas, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 598 days.

(21) Appl. No.: 12/110,613

(22) Filed: Apr. 28, 2008

(65) Prior Publication Data

US 2009/0266100 A1    Oct. 29, 2009

(51) Int. Cl.
*F25J 1/00* (2006.01)
(52) U.S. Cl. ............................. 62/613; 62/47.1; 62/118
(58) Field of Classification Search .................. 62/113, 62/335, 513, 47.1, 50.2, 613, 620
See application file for complete search history.

(56) References Cited

U.S. PATENT DOCUMENTS

| | | | |
|---|---|---|---|
| 3,714,793 A | 2/1973 | Eigenbrod | |
| 4,186,562 A * | 2/1980 | Tyree, Jr. | 62/62 |
| 5,313,787 A * | 5/1994 | Martin | 62/222 |
| 5,337,572 A | 8/1994 | Longsworth | |
| 5,410,886 A | 5/1995 | Wallace et al. | |
| 5,730,216 A | 3/1998 | Viegas et al. | |
| 5,921,090 A * | 7/1999 | Jurewicz et al. | 62/50.2 |
| 6,062,030 A * | 5/2000 | Viegas | 62/175 |
| 6,298,683 B1 | 10/2001 | Kondo et al. | |
| 6,327,866 B1 | 12/2001 | Novak et al. | |
| 6,595,009 B1 | 7/2003 | Howard et al. | |
| 6,631,621 B2 * | 10/2003 | VanderWoude et al. | 62/201 |
| 7,021,341 B2 | 4/2006 | Viegas et al. | |
| 7,055,590 B2 | 6/2006 | Hara | |
| 7,065,979 B2 | 6/2006 | Arshansky et al. | |
| 2003/0131618 A1 | 7/2003 | Doi et al. | |
| 2003/0234296 A1 | 12/2003 | Rixen et al. | |
| 2004/0148956 A1 | 8/2004 | Arshansky et al. | |

FOREIGN PATENT DOCUMENTS

JP        2007303793        11/2007

* cited by examiner

*Primary Examiner* — Melvin Jones
(74) *Attorney, Agent, or Firm* — Michael Best & Friedrich LLP

(57) ABSTRACT

A temperature-controlled vehicle including a cascade refrigeration system having a booster cooling line configured to supplement the cooling capacity of the cascade refrigeration system by expanding and venting a portion of a cryogenic refrigerant to the atmosphere during peak demands while the cascade refrigeration system continues to operate.

20 Claims, 4 Drawing Sheets

CLOSED AND OPEN LOOP CRYOGENIC REFRIGERATION SYSTEM

BACKGROUND

The present invention relates to a low pressure cryogenic refrigeration system for a vehicle cargo space and a method of operating the same.

Typically, to cool a vehicle cargo space, cryogens are evaporated in a cooling coil that is in thermal communication with a load space to cool the load space, and the cryogen is then released to the atmosphere. A cryogen storage tank must regularly be refilled in order to replace cryogen that is lost to the atmosphere. Additionally, conventional vapor compression refrigeration systems are sized to handle the peak demand on the system, such as initial pull-down from ambient conditions, pull-down immediately after a defrost cycle and after door openings. Therefore, refrigeration systems are typically larger than the size needed during normal operating conditions.

SUMMARY

In one embodiment, the invention provides a cascade refrigeration system for a vehicle defining a cargo space, the cascade refrigeration system having a booster cooling line configured to supplement the cooling capacity of the cascade refrigeration system by expanding and venting a portion of a cryogenic refrigerant to the atmosphere during peak demands while the cascade refrigeration system continues to operate.

In another embodiment, the invention provides a cascade refrigeration system for a vehicle cargo space, the cascade refrigeration system having a cryogenic storage tank configured to be coupled to the vehicle, to receive and store the cryogenic refrigerant from a fill station, to receive and store the condensed cryogenic refrigerant from the cascade heat exchanger, and to direct the cryogenic refrigerant to a heat exchanger that cools the cargo space.

In another embodiment, the invention provides a method of cooling a load space including a first mode of operation in which a cascade refrigeration system having a cryogenic refrigerant provides cooling by way of a heat exchanger in a circuit operating as a closed loop circuit, and a second mode of operation in which a booster cooling line provides additional cooling by expanding a portion of the cryogenic refrigerant and venting that portion to the atmosphere while the circuit operates as a combined closed loop and open loop system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
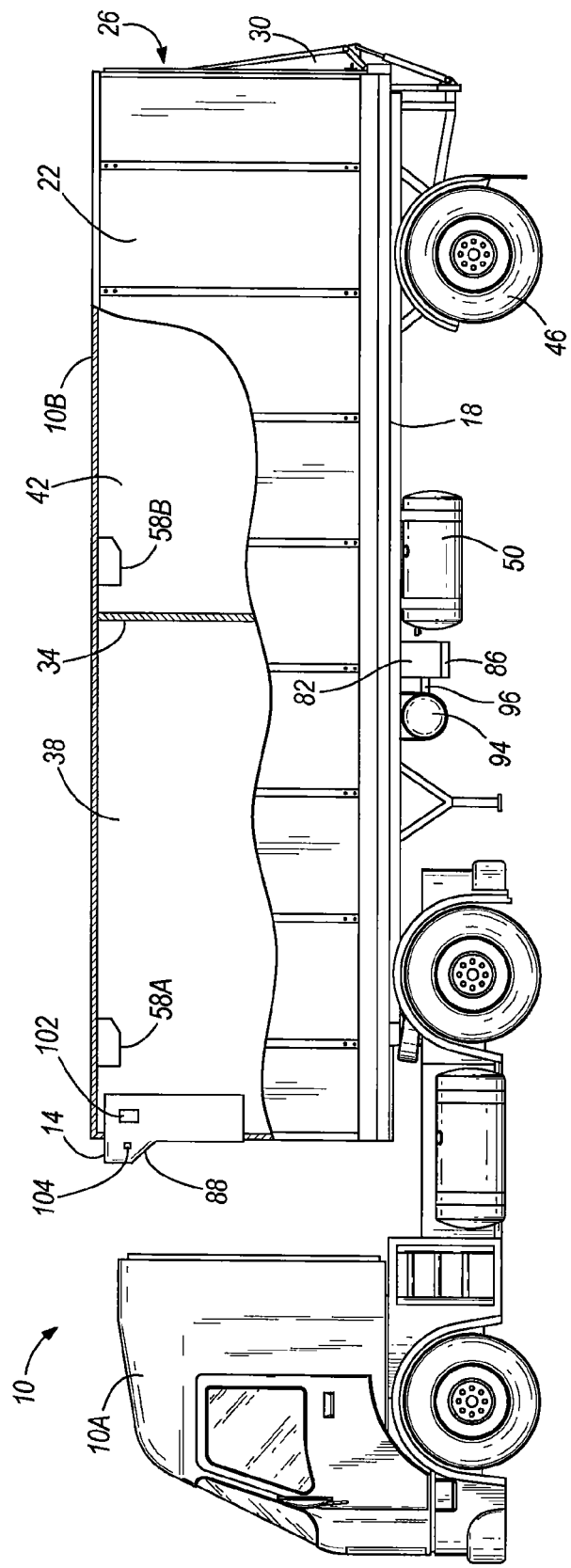
FIG. 1 is a side view of a vehicle including a trailer having a refrigeration system according to the present invention.

FIG. 1 shows a vehicle 10, in particular a truck 10A and trailer 10B defining a cargo or load space 26. In other embodiments, the vehicle 10 can be a straight truck, van, or the like having an integral cargo portion, which is not readily separable from an associated driving portion.

As shown in FIG. 1, the trailer 10B includes a frame 18 and an outer wall 22 supported on the frame 18 and substantially enclosing the load space 26. Doors 30 are supported on the frame 18 for providing access to the load space 26. In some embodiments, the load space 26 can include a partition or an internal wall 34 for at least partially dividing the load space 26 into sub-compartments, including two or more load space zones 38, 42, each of which can be maintained at a different set point temperature, as described in greater detail below. A plurality of wheels 46 are provided on the frame 18 to permit movement of the vehicle 10 across the ground.

Figure 2:
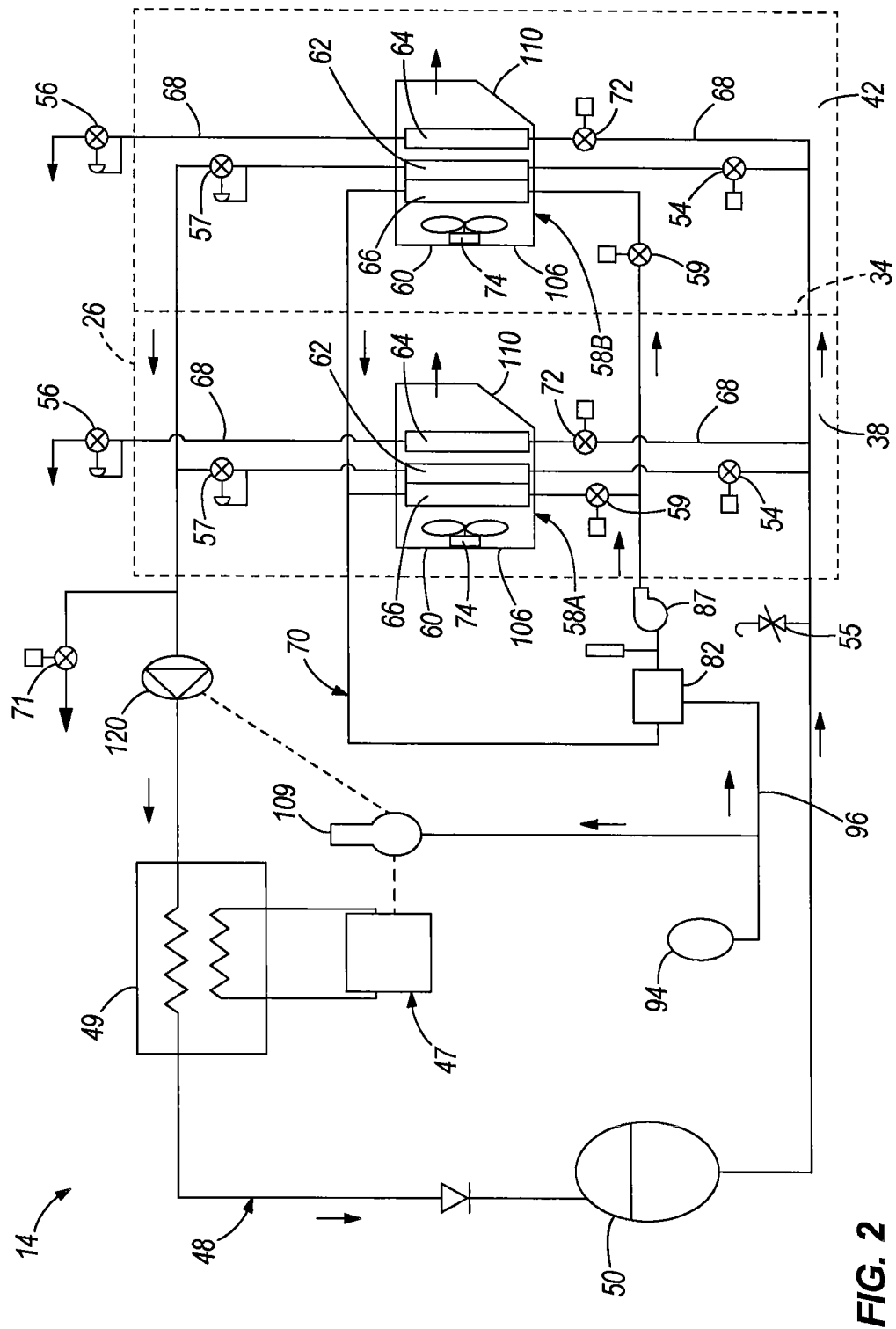
FIG. 2 is a schematic representation of the refrigeration system shown in FIG. 1.

As shown in FIG. 2, the refrigeration system 14 includes a first refrigeration circuit 47. The first refrigeration circuit 47 is a typical vapor compression circuit, such as a R404A system, including a cascade heat exchanger 49 in thermal communication with a second refrigeration circuit 48 to cool and condense at least a portion of a cryogenic refrigerant contained within the second refrigeration circuit 48. The cascade heat exchanger 49 evaporates a refrigerant of the first refrigeration circuit 47 at a temperature of about −20 degrees Fahrenheit.

The second refrigeration circuit 48 includes a cryogen storage tank 50 housing a quantity of a cryogen, for example, carbon dioxide ($CO_2$). As illustrated in FIG. 1, the cryogen storage tank 50 is supported on the frame 18 under the load space 26. In other embodiments, the cryogen storage tank 50 can be located in another location on the vehicle 10, such as, for example, in the trailer 10B (within or separately contained from the load space 26), on the outer wall 22 of the trailer 10B, in a nose cap 88 secured to a forward end of the trailer 10B, etc. The cryogen storage tank 50 is preferably a vacuum-insulated vessel and is configured to receive and store the cryogen from a specialized cryogen fill station. In one construction, the tank 50 stores the cryogen at 230 psi and −15 degrees Fahrenheit and exhibits a 1% loss rate when the refrigeration system 14 is turned off.

As shown in FIG. 2, the refrigeration circuit 48 includes flow control valves 54 for controlling and/or interrupting the flow of cryogen out of the cryogen storage tank 50 and to the heat exchangers 58A and/or 58B. In the illustrated embodiment, the valves 54 are positioned downstream from the cryogen storage tank 50. In some embodiments, the valves 54 can be positioned in different locations along the second refrigeration circuit 48. The valves 54 may include electronically controlled valves, pulse motor valves, multiple valves in parallel, or any other valve configuration that allows adjustment of a refrigerant flow rate through the valve(s). A pressure relief valve 55 is positioned just upstream of the flow control valves 54 to provide over-pressure protection.

The refrigeration system 14 also includes one or more heat exchanger units 58A, 58B. As illustrated in FIGS. 1 and 2, the refrigeration system 14 includes a first heat exchanger unit 58A positioned in the first load space zone 38 and a second heat exchanger unit 58B positioned in the second load space zone 42. In other embodiments, the refrigeration system 14 can include one, three, or more heat exchanger units positioned in one, three, or more load space zones. In some embodiments, the heat exchanger units 58A, 58B are mounted substantially external to the load space 26, but in heat exchange communication therewith.

In some embodiments, as illustrated in FIG. 2, the first and second heat exchanger units 58A, 58B are substantially similar. Accordingly, while the following description makes reference to elements of the first heat exchanger unit 58A, it should be understood that the second heat exchanger unit 58B can include identical or substantially similar structure. Alternately, the first and second heat exchanger units 58A and 58B can be differently configured (e.g., differently configured to provide different heating/cooling capacities, etc.).

As shown in FIG. 2, the first heat exchanger unit 58A includes a housing 60, a first evaporator coil 62, a second evaporator coil 64 and a heating coil 66. The first evaporator coil 62 is fluidly connected to and positioned along the second refrigeration circuit 48, and the second evaporator coil 64 is fluidly connected to a booster line 68 positioned along the second refrigeration circuit 48. The booster line 68 may include the line immediately before and immediately after the second evaporator coil 64, as indicated in FIG. 2. The heating coil 66 is fluidly connected to and positioned along a heating circuit 70.

As shown in FIG. 2, a vent valve 71 is in fluid communication with the second refrigeration circuit 48 between the heat exchanger unit 58A or 58B and a compressor 120. In one construction, the compressor is operable to compress the cryogen to approximately 275 psi. The vent valve 71, normally closed, can be opened to vent the cryogen in the second refrigeration system 48 to the atmosphere in case the vapor compression system 47 is unable to cool and condense the cryogen.

As shown in FIG. 2, the booster line 68 is positioned along the second refrigeration circuit 48 in fluid communication with the cryogen storage tank 50. The booster line 68 includes a flow control valve 72 positioned between the cryogen storage tank 50 and the second evaporator coil 64 to permit or block the flow of cryogen through the booster line 68. The booster line 68 is configured to vent a portion of the cryogen in the second refrigeration circuit 48 to the atmosphere when the flow control valve 72 is open. A back pressure regulator valve 56 is positioned between the second evaporator 64 and an end of the booster line 68, in fluid communication with the atmosphere, to maintain a back pressure in the second evaporator coil 64 to prevent the formation of dry ice. FIG. 2 also illustrates a back pressure regulator valve 57 located downstream of each of the first evaporator coils 62. In one embodiment, the back pressure regulator valves 56, 57 are set to 70 psi. If the compressor 120 is of the type requiring a lubricant (oil), an oil separator may be necessary to prevent oil from being vented to the atmosphere. Preferably, the oil separator would be positioned just downstream of the compressor.

Figure 3:
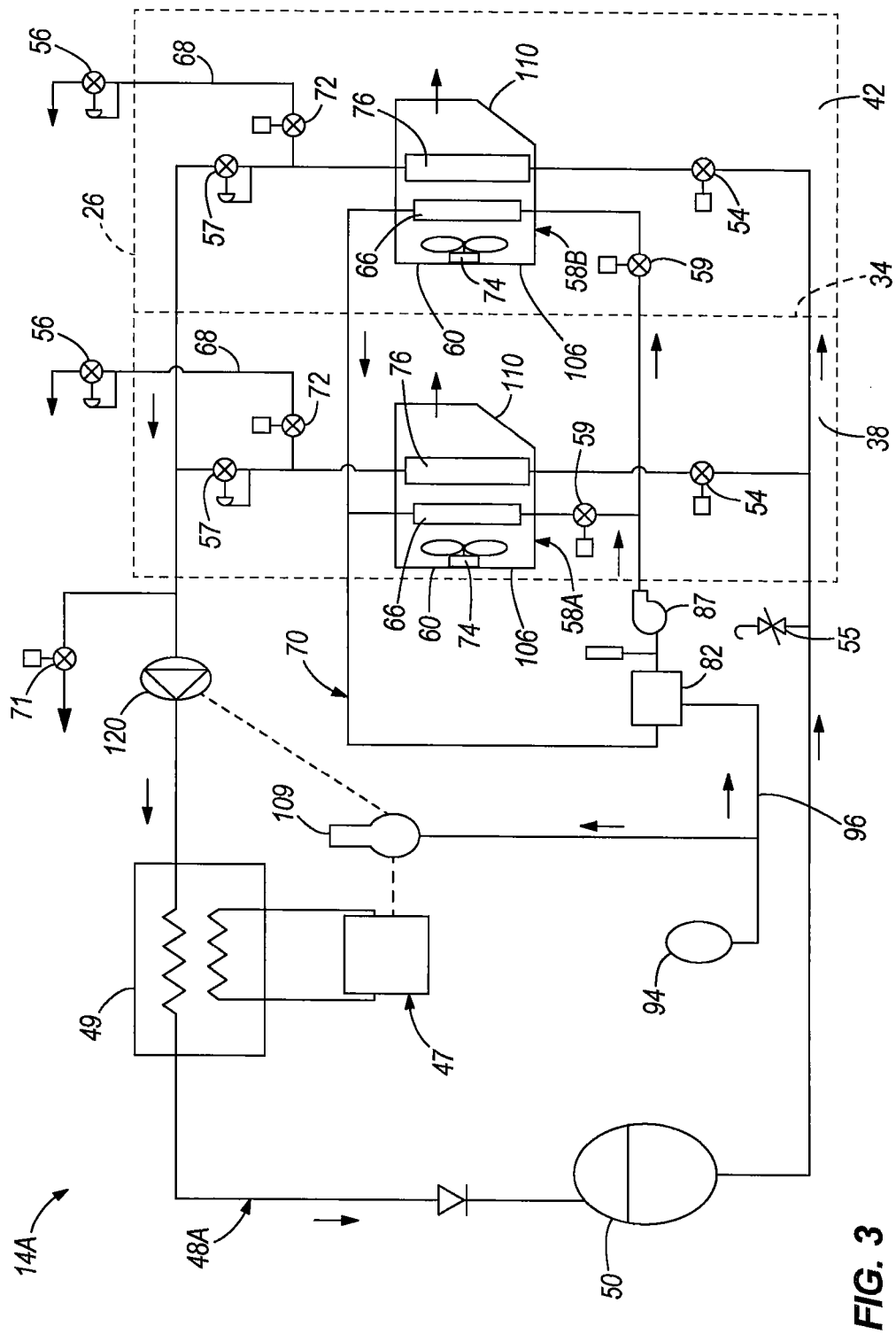
FIG. 3 is a schematic representation of another construction of the refrigeration system shown in FIG. 2.

The first and second evaporator coils 62, 64 may alternatively be combined as one unit having two fluidly separate coils. Yet another alternative is to combine the first and second evaporators 62, 64 as one integrated coil 76 sized for higher cooling needs, as illustrated in a refrigeration system 14A in FIG. 3. In this construction, the flow control valve 72 is located between the integrated coil 76 and the back pressure regulator valve 56. The booster line 68 is the line located immediately downstream of the integrated coil 76 that opens to the atmosphere and includes the flow control valve 72 and the back pressure regulator valve 56. It should be understood that the refrigeration system 14A in FIG. 3 is the same as the refrigeration system 14 in FIG. 2 except that the first and second evaporator coils 62, 64 are integrated as one, the flow control valve 72 is placed downstream of the integrated evaporator 76, and the booster line 68 is located downstream, but not upstream, of the integrated coil 76. Any description of the refrigeration system 14 (FIG. 2) provided herein can be used to describe the remaining portions of the refrigeration system 14A illustrated in FIG. 3. Accordingly, the second refrigeration circuit of FIG. 3 is called the second refrigeration circuit 48A.

As shown in FIGS. 2 and 3, the second refrigeration circuit 48, 48A and the cryogen conveyed through the refrigeration circuit 48, 48A are maintained separately from the heating circuit 70 and the heat transfer fluid (e.g., glycol/water mixture) conveyed through the heating circuit 70 so that the cryogen and the heat transfer fluid are not mixed.

The housing 60 includes an air inlet 106 and an air outlet 110 for receiving air from and returning air to the load space 26, respectively. The housing 60 also supports a fan or blower 74 for drawing load space air into the heat exchanger housing 60 through the air inlet 106, moving the load space air across the coils 62, 64, and 66 or 76 and returning the load space air to the load space 26 through the air outlet 110.

As shown in FIGS. 2 and 3, the refrigeration system 14, 14A includes a heating element 82, such as, for example, a diesel-fired heating element. A pump 87 pumps heat transfer fluid through the heating circuit 70. The heat transfer fluid is heated in the heating element 82 and then it is pumped to at least one of the heat exchanger units 58A and 58B, where the heat is then transferred to the load space 26.

The heating element 82 is supported on the frame 18 under the load space 26. In other embodiments, the heating element 82 can be located in another location on the vehicle 10, such as, for example, in the trailer 10B (within or separately contained from the load space 26), on the outer wall 22 of the trailer 10B, and the like. In still other embodiments, the heating element 82 can be located in the nose cap or power box 88, which is secured to a forward end of the outer wall 22.

As illustrated in FIGS. 1-3, and provided that the heating element 82 is diesel-fired, the refrigeration system 14, 14A can include a fuel storage tank 94. In some embodiments, other heating elements 82 such as electric heaters, or heaters utilizing other fuels and other fuel storage tanks 94 can also or alternately be used.

As shown in FIG. 1, the fuel storage tank 94 is supported on the frame 18 under the load space 26. In some embodiments, the fuel storage tank 94 can be located in another location on the vehicle 10, such as, for example, in the nose cap 88, in the trailer 10B (within or separately contained from the load space 26), on the outer wall 22 of the trailer 10B, and the like. The refrigeration system 14 also includes a fuel line 96 extending between the fuel storage tank 94 and the heating element 82. Fuel is supplied to the heating element 82 and combined with air for combustion. Exhaust gases of the combustion are exhausted from the heating element 82 to the atmosphere.

Figure 4:
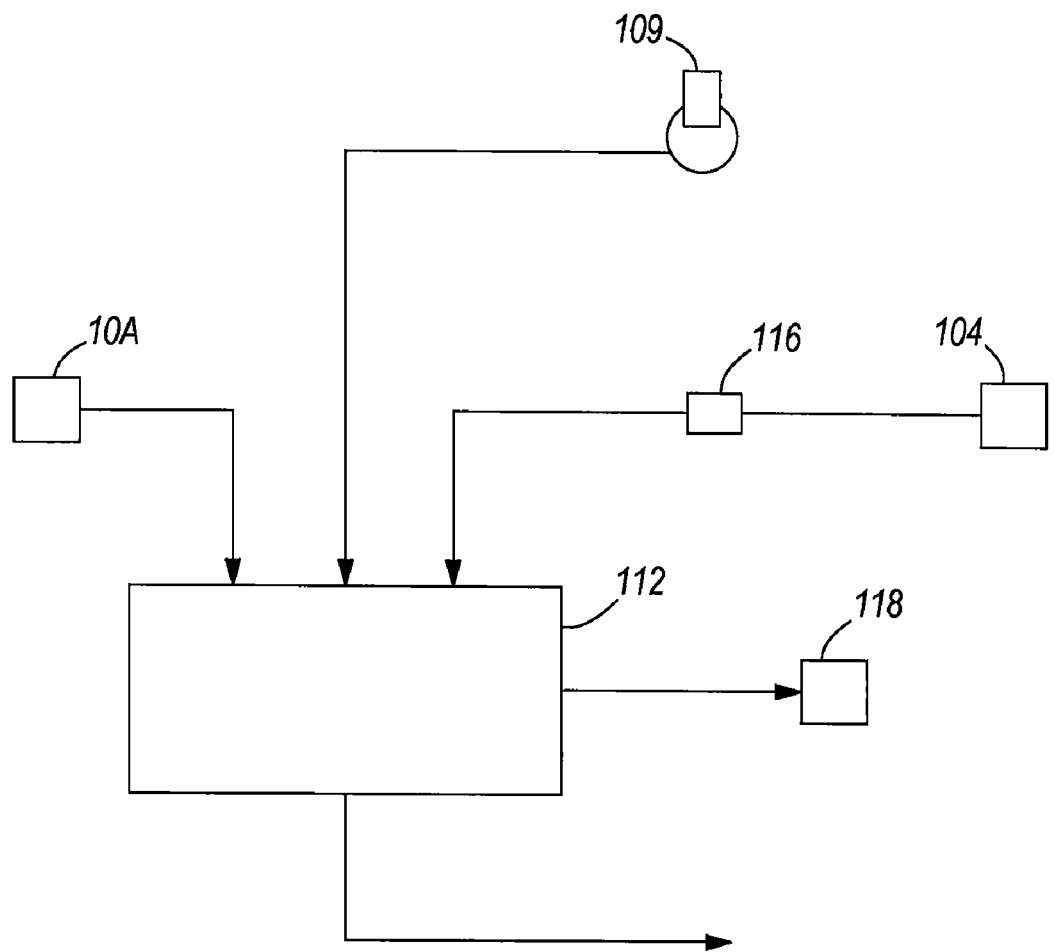
FIG. 4 is a schematic representation of the power system of the refrigeration systems of FIGS. 2 and 3.

The refrigeration system 14, 14A also includes a battery 112, shown schematically in FIG. 4. The battery 112 could be charged by an engine 109 and alternator. The battery 112 could additionally be charged by, for example, the tractor 10A, a fuel cell, a fossil fuel powered generator set, and the like in any combination or individually. If a fuel cell were employed, then the engine 109 would not be necessary. The battery 112 supplies power to the fans 74, a controller 102, heater fluid pump 87, diesel-fired heater, and other power-consuming elements. Additionally, if it has a large enough capacity, the battery 112 may supply power to an electric motor 118, such as the electric motor that runs the compressor 120 or the vapor compression circuit 47.

As illustrated in FIG. 1, the refrigeration system 14, 14A can also include an electrical input or receptacle 104 for receiving power from one or more external power sources (external to the trailer 10B, and in some cases external to the vehicle 10). For example, the receptacle 104 can be configured for receiving power from a land-based power network (e.g., an AC power outlet available at a truck depot), and for supplying electrical power to the fans 74, a controller 102, and/or other power-consuming elements of the refrigeration system 14, 14A. A converter 116, illustrated schematically in FIG. 4, converts AC to DC to charge the battery 112. Alternately or in addition, the receptacle 104 can be configured to receive DC electrical power from an external power source.

In some situations, an external power source (e.g., an engine or a battery of the tractor 10A, a land-based power network, etc.) can supply power to the power-consuming elements of the refrigeration system 14, 14A during operation of the refrigeration system 14, 14A when the vehicle 10 is connected to the tractor 10A or when the vehicle 10 is parked at a depot having a land-based power network. In other situations, the battery 112 can supply power to the power-consuming elements of the refrigeration system 14, 14A when the vehicle 10 is not connected to the tractor 10A and/or when the vehicle 10 is parked in a location not having an available land-based power network or other external electrical power source.

In some embodiments, the controller 102 can operate the refrigeration system 14, 14A in a first cooling mode, a second cooling mode, a heating mode, and a defrost mode to maintain or achieve a desired set point temperature in the load space zones 38, 42. Each load space zone 38, 42 can independently maintain and achieve a different set point temperature. For example, the first load space zone 38 can be in a cooling mode while the second load space zone 42 is in a heating mode or a defrost mode.

In case the vapor compression circuit 47 is unable to cool and condense the cryogen in the second refrigeration circuit 48, the second refrigeration circuit 48 can operate as an open loop system. The vent valve 71 can be opened to prevent the second refrigeration system 48 from exceeding safe working pressures. Furthermore, refrigeration of goods in the cargo space 26 can continue by evaporating the cryogen from the storage tank 50 in the evaporator coil 62 (or integrated coil 76 for the second refrigeration circuit 48A) and venting it to the atmosphere by way of the vent valve 71.

During operation of the refrigeration system 14, 14A in the first cooling mode, a first portion of cryogen is directed through the refrigeration circuit 48 to the evaporator coil 62 (or integrated coil 76 for the second refrigeration circuit 48A) of the first heat exchanger unit 58A and/or of the second heat exchanger unit 58B. The fan 74 draws load space air into the heat exchanger housing 60 through the inlet 106, directs the load space air across the evaporator coil 62 (or integrated coil 76 for the second refrigeration circuit 48A) to cool the load space air, and returns the cooled load space air to the load space 26 through the air outlet 110. As the first portion of cryogen travels through the evaporator coil 62 or integrated coil 76, the first portion of cryogen is vaporized. The vaporized first portion of cryogen from each heat exchanger unit 58A, 58B is then compressed by the compressor 120 and then condensed in the cascade heat exchanger 49 by the first refrigeration circuit 47. The condensed first portion of cryogen then returns to the cryogen storage tank 50 and is directed again to the evaporator coil 62 (or integrated coil 76 for the second refrigeration circuit 48A).

A second cooling mode is used during peak demands when higher capacities are needed, such as during initial pull-down from ambient conditions, during pull-down immediately after a defrost operation, and after door openings (for deliveries). During operation in the second cooling mode, control valve 72 is opened so that a second portion of cryogen enters the booster cooling line 68 and is evaporated in the second evaporator 64 (or enters the booster line 68 after passing through the integrated coil 76 for the second refrigeration circuit 48A) of the first heat exchanger unit 58A and/or the second heat exchanger unit 58B. The fan 74 then draws load space air into the heat exchanger housing 60 through the inlet 106, directs the load space air across the second evaporator 64 (or integrated coil 76 for the second refrigeration circuit 48A) to cool the load space air, and returns the cooled load space air to the load space 26 through the air outlet 110. The evaporator fan(s) 74 may be a multi- or variable-speed fan that operates at a higher speed during the second cooling mode to provide the air flow across the evaporator 64 or 76 needed for the increased cooling capacity. The second portion of cryogen is then released to the atmosphere by way of the back pressure regulator valve 56. The refrigeration cycle described in the first cooling mode, in which the first portion of cryogen is evaporated, condensed and returned to the cryogen storage tank 50, continues simultaneously. In this way, the cooling capacity of the system is increased without increasing the size of the first and second refrigeration circuits 47, 48, 48A.

During operation in the heating mode, the heating element 82 heats the heat transfer fluid in the heating circuit 70. The heated fluid is then pumped by the pump 87 through the heating circuit 70 to the heating coil 66 of the first heat exchanger unit 58A and/or the second heat exchanger unit 58B. The fan 74 then draws load space air into the heat exchanger housing 60 through the inlet 106, directs the load space air across the heating coil 66 to warm the load space air, and returns the warmed load space air to the load space 26 through the air outlet 110. The heat transfer fluid is then cycled back through the heating circuit 70 to be reheated by the heating element 82.

During operation in defrost mode, the air inlet 106 and/or the air outlet 110 of each heat exchanger unit 58A, 58B are closed (e.g., by doors or flaps) and/or the fans 74 are shut down to limit the transfer of heat from the first heat exchanger unit 58A and/or the second heat exchanger unit 58B to the load space 26. Alternately, the fan speed can be lowered during the defrost mode. The heating element 82 then heats the heat transfer fluid in the heating circuit 70. The heated fluid is then pumped through the heating circuit 70 to the heating coil 66 of the first heat exchanger unit 58A and/or the second heat exchanger unit 58B. Heat from the heating coil 66 then defrosts and/or thaws the adjacent evaporator coil 62, 64, 76 in the first heat exchanger unit 58A and/or the second heat exchanger unit 58B.

During the heating mode and the defrost mode, the controller 102 prevents cryogen from moving through the refrigeration circuit 48 from the cryogen storage tank 50 to the evaporator coils 62. One or more of the valves 54 are closed during operation of the refrigeration system 14 in a heating and/or defrost mode. Similarly, flow control valves 59 of the heating circuit 70 may be closed to prevent the heat transfer fluid from reaching the heat exchanger 58A or 58B during the first cooling mode or the second cooling mode. The flow control valves 59 may include the same types of valves previously described with reference to the flow control valves 54.

The first cooling mode is sufficient for a majority of the operation time, such as during transport of the cargo space while the vehicle is on the road. Typically, cooling systems are sized to handle the peak demand on the system. With the added cooling capacity of the booster line 68, the refrigeration system 14, 14A of the present invention can be sized for typical lower-capacity operating conditions, making it smaller than previous refrigeration systems made for this application. Additionally, the duration of a single charge of the cryogen storage tank is lengthened because at least a portion of the cryogen is condensed and returned to the tank 50 during all operating conditions, instead of being completely vented to the atmosphere. This extends the range of the vehicle for a given capacity of the storage tank 50 and reduces the need for frequent stops to refill the cryogen tank. Furthermore, purchasing less cryogen and using a smaller refrigeration system saves money, reduces emissions, and reduces noise.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Thus, the invention provides, among other things, a refrigeration system for a vehicle transport unit that condenses and reuses cryogen and that is sized smaller than a refrigeration system sized for peak demands. Various features and advantages of the invention are set forth in the following claims.

What is claimed is:

1. A refrigeration system for a vehicle defining a cargo space, the refrigeration system comprising:
    a first refrigeration circuit for circulating a refrigerant, the first refrigeration circuit including a first heat exchanger; and
    a second refrigeration circuit for circulating a cryogenic refrigerant, the second refrigeration circuit including
        a compressor for compressing the cryogenic refrigerant, the first heat exchanger fluidly connected to the compressor to receive the cryogenic refrigerant from the compressor, the first heat exchanger cooling and condensing the cryogenic refrigerant,
        a second heat exchanger in fluid communication with the first heat exchanger to receive the cryogenic refrigerant from the first heat exchanger and configured to absorb heat from air being directed into the cargo space to cool the cargo space when the second refrigeration circuit operates as a closed loop system in a first mode of operation operable to provide a first cooling capacity of the second refrigeration circuit, and
        a booster cooling line in fluid communication with the second refrigeration circuit, wherein the booster cooling line includes a valve configured to vent a portion of the cryogenic refrigerant to the atmosphere to absorb additional heat from air being directed into the load space to further cool the load space when the second refrigeration circuit operates as a combined closed loop and open loop system in a second mode of operation operable to provide a second cooling capacity of the second refrigeration circuit greater than the first cooling capacity.

2. The refrigeration system of claim 1, wherein the booster cooling line is in fluid communication with the second heat exchanger.

3. The refrigeration system of claim 1, wherein the second refrigeration circuit includes a third heat exchanger in fluid communication with the first heat exchanger, wherein the booster cooling line is in fluid communication with the third heat exchanger.

4. The refrigeration system of claim 1, wherein the second refrigeration circuit includes a cryogenic storage tank configured to be coupled to the vehicle and to receive and store the cryogenic refrigerant from a fill station, the storage tank fluidly connected between the first and second heat exchangers, the storage tank receiving condensed cryogenic refrigerant from the first heat exchanger, and directing condensed cryogenic refrigerant to the second heat exchanger.

5. The refrigeration system of claim 1, wherein the booster cooling line includes a flow control valve in fluid communication with the second refrigeration circuit, the flow control valve being configured to open in the second mode of operation.

6. The refrigeration system of claim 5, wherein the booster cooling line includes a back pressure regulator valve in fluid communication with the second refrigeration circuit, the back pressure regulator valve having a pressure set-point, the back pressure regulator valve configured to vent a portion of the coolant when the pressure in the booster cooling line exceeds the pressure set-point.

7. The refrigeration system of claim 6, wherein the second refrigeration circuit includes a second back-pressure regulator valve in fluid communication between the second heat exchanger and the compressor, the second back-pressure regulator valve having a second set-point pressure and being configured to vent coolant to the atmosphere when the pressure in the second refrigeration circuit exceeds the second set-point pressure.

8. The refrigeration system of claim 6, wherein the pressure set-point is approximately 70 psi.

9. The refrigeration system of claim 1, wherein the first cooling capacity is approximately 25-50% of the second cooling capacity.

10. The refrigeration system of claim 9, wherein the total cooling capacity of the first refrigeration circuit and the second refrigeration circuit is sized for peak demand of the refrigeration system.

11. The refrigeration system of claim 1, wherein the second refrigeration circuit includes a second flow control valve in fluid communication with the cryogen storage tank and the second heat exchanger, the flow control valve regulating the flow of coolant from the storage tank to the second heat exchanger.

12. A refrigeration system for a vehicle defining a cargo space, the refrigeration system comprising:
    a first refrigeration circuit for circulating a refrigerant, the first refrigeration circuit including a first heat exchanger; and
    a second refrigeration circuit for circulating a cryogenic refrigerant, the second refrigeration circuit including
        a compressor for compressing the cryogenic refrigerant, the first heat exchanger fluidly connected to the compressor to receive the cryogenic refrigerant from the compressor, the first heat exchanger cooling and condensing the cryogenic refrigerant, a second heat exchanger in fluid communication with the first heat exchanger to receive the cryogenic refrigerant from the first heat exchanger and configured to absorb heat from air being directed into the cargo space to cool the cargo space, and a cryogenic storage tank configured to be coupled to the vehicle and to receive and store the cryogenic refrigerant from a fill station, the storage tank fluidly connected between the first and second heat exchangers, the storage tank receiving condensed cryogenic refrigerant from the first heat exchanger, and directing condensed cryogenic refrigerant to the second heat exchanger.

13. The refrigeration system of claim 12, wherein the cryogen storage tank is a vacuum-insulated vessel.

14. The refrigeration system of claim 12, wherein the second refrigeration circuit is a low pressure $CO_2$ system.

15. The refrigeration system of claim 12, wherein the first refrigeration circuit is a vapor compression circuit.

16. The refrigeration system of claim 12, further comprising a deep cycle battery configured to provide electrical power to at least one of the first refrigeration circuit and the second refrigeration circuit, wherein the deep cycle battery is charged by at least one of an engine alternator, a tractor of the vehicle, and a conventional plug-in source of electricity.

17. A method of cooling a load space of a vehicle, the method comprising:
    circulating a refrigerant through a first refrigeration circuit including a first heat exchanger;
    circulating a cryogenic refrigerant through a second refrigeration circuit;
    compressing the cryogenic refrigerant with a compressor of the second refrigeration circuit;
    delivering the cryogenic refrigerant from the compressor to the first heat exchanger;
    cooling and condensing the cryogenic refrigerant at the first heat exchanger;
    delivering the cryogenic refrigerant from the first heat exchanger to a second heat exchanger;
    absorbing heat from air being directed into the cargo space with the cryogenic refrigeration in the second heat exchanger to cool the cargo space when the second refrigeration circuit operates as a closed loop system in a first mode of operation operable to provide a first cooling capacity of the second refrigeration circuit;
    venting to the atmosphere a portion of cryogenic refrigerant through a booster cooling line in fluid communication with the second refrigeration circuit to absorb additional heat from air being directed into the load space to further cool the load space when the second refrigeration circuit operates as a combined closed loop and open loop system in a second mode of operation operable to provide a second cooling capacity of the second refrigeration circuit greater than the first cooling capacity.

18. The method of claim 17, further comprising delivering cryogenic refrigerant from the second heat exchanger to the booster cooling line in the second mode of operation.

19. The method of claim 17, further comprising:
    delivering the cryogenic refrigerant from the first heat exchanger to a third heat exchanger of the second refrigeration circuit;
    delivering cryogenic refrigerant from a third heat exchanger to the booster cooling line in the second mode of operation.

20. The method of claim 17, further comprising:
    coupling a cryogenic storage tank to the vehicle;
    fluidly connecting the cryogenic storage tank between the first and second heat exchangers;
    filling the cryogenic storage tank with the cryogenic refrigerant at a cryogenic filling station;
    storing the cryogenic refrigerant into the cryogenic storage tank;
    receiving at the cryogenic storage tank condensed cryogenic refrigerant from the first heat exchanger; and
    directing cryogenic refrigerant from the cryogenic storage tank to the second heat exchanger.

* * * * *